United States Patent [19]
Lee et al.

[11] Patent Number: 6,093,229
[45] Date of Patent: Jul. 25, 2000

[54] DRIVE CHECKING SYSTEM FOR FAN FILTER UNITS IN CLEAN ROOM

[75] Inventors: Kun-hyung Lee; Jung-sung Hwang; Yo-han Ahn; Jae-heung Choi, all of Kyungki-do, Rep. of Korea

[73] Assignee: Samsung Electronics Co., Ltd., Suwon, Rep. of Korea

[21] Appl. No.: 09/172,152

[22] Filed: Oct. 14, 1998

[30] Foreign Application Priority Data

Dec. 8, 1997 [KR] Rep. of Korea ........................ 97-66720

[51] Int. Cl.[7] .................................................. B01D 35/143
[52] U.S. Cl. ............................ 55/385.2; 55/471; 55/484; 55/DIG. 34; 96/421; 454/187; 116/266
[58] Field of Search .................................. 55/385.2, 471, 55/472, 473, 467, 484, DIG. 34; 96/417, 418, 419, 421, 422, FOR 170; 454/187; 116/264, 266, 273, 274, 275, DIG. 25

[56] References Cited

U.S. PATENT DOCUMENTS 4,820,319 4/1989 Griffis ..................................... 55/385.2

5,069,113 12/1991 Mattson et al. .

FOREIGN PATENT DOCUMENTS

| 60-62518 | 4/1985 | Japan | ............................... 96/FOR 170 |
| 63-205114 | 8/1988 | Japan | ............................... 96/FOR 170 |
| 3-48166 | 3/1991 | Japan | ..................................... 116/264 |
| 4-103937 | 4/1992 | Japan | ..................................... 454/187 |

*Primary Examiner*—David A. Simmons
*Assistant Examiner*—Robert A. Hopkins
*Attorney, Agent, or Firm*—Jones Volentine, LLP

[57] ABSTRACT

A fan drive checking system, for an air conditioning system in a clean room having a fan filter unit (FFU), includes a flow sensor for sensing air flow inside a housing of a FFU. The sensor provides a sensor signal indicative of normal and adverse flow conditions in the housing. A control portion in data communication with the sensor outputs a control signal responsive to the sensing signal. An alarm in data communication with the control portion provides a warning when the control signal indicates the adverse flow condition.

13 Claims, 5 Drawing Sheets

DRIVE CHECKING SYSTEM FOR FAN FILTER UNITS IN CLEAN ROOM

BACKGROUND OF THE INVENTION

1. Field of the Invention

The present invention relates to a drive checking system for fan filter units in a clean room. More particularly, the malfunctioning of each of a plurality of fan filter units used for air conditioning in a semiconductor clean room is detected individually and produces an alarm, so that proper air conditioning in the clean room is maintained more efficiently.

2. Description of the Related Art

Generally, a clean room for manufacturing semiconductor devices has an air conditioning system to circulate and maintain the cleanliness of the air therein. There are two types of air conditioning systems used in clean rooms; a central system using a large circulation fan, and an individual system using a plurality of small fan filter units. As comparted to the central system, the individual system has the advantages of compact structure, little noise, little vibration, energy savings, and easy control of air flow. Therefore, the individual air conditioning system, employing multiple small fan filter units, is becoming more widely used in semiconductor clean rooms than the central air conditioning system using the large fan. The fans used in the air conditioning system in the normal semiconductor clean room are illustrated in U.S. Pat. No. 5,069,113.

In the individual air conditioning system, a plurality of fan filter units 10, one of which is shown in FIG. 1, are installed in the ceiling of a clean room according to a specified arrangement. The fan filter unit 10, which includes a filter 18 and air supply fan 12, filters the circulating air and supplies it to the clean room. Using the conventional fan filter unit 10, air is introduced from the ceiling of the clean room as driven by the fan 12. The air then flows along a flow path inside a housing 14, through an insulator 16, a grid plate at the filter interface, and then through the filter 18 before flowing into the clean room.

Inside the clean room the air flows downward from the ceiling to the bottom of the clean room, where it is collected in an air circulation duct which carries it again to the ceiling. The air is then recirculated by the fan filter unit. In this arrangement, particles are directed to the bottom of the clean room by the air stream, which prevents the particles from being introduced into the semiconductor device fabrication equipment on the production line. Also, the pressure in the clean room is maintained at a higher level than the pressure outside to prevent the particle-containing air outside the clean room from being introduced into the clean room.

Since the normal air conditioning system for a clean room has a plurality of fan filter units, as described above, it is difficult to monitor and detect a malfunction (i.e., an abnormal operational state) in each fan filter unit. Normally, the abnormal operational state of a fan filter unit is detected only by checking the state of the current or the voltage that is supplied to the fan. However, this method cannot detect a malfunctioning fan filter unit accurately and directly because sometimes the fan filter unit is malfunctioning even when the current or voltage is supplied correctly.

As a result, in the individual unit air conditioning system, an adverse air stream can be generated when a fan filter unit malfunctions causing contaminating particles to be introduced into the clean room. Further, the adverse air stream may continue undetected for a long time. The malfunction of several fan filter units out of the entire arrangement of fan filter units can have a serious adverse effect on the air environment inside the clean room and cause a decrease in the productivity of the fabrication facility.

SUMMARY OF THE INVENTION

The present invention is directed to a fan drive checking system for a fan filter unit in a semiconductor clean room air conditioning system, which substantially overcomes one or more of the problems due to the limitations and the disadvantages of the related art.

One object of the present invention is to provide a drive checking system which detects the change of actual air flow in the fan filter unit housing when the fan malfunctions.

Another object of the present invention is to indicate a malfunctioning fan filter unit in situ.

Another object of the present invention is to employ a network to remotely indicate a malfunctioning fan.

To achieve these and other objects and advantages of the present invention, a fan drive checking system, for an air conditioning system in a clean room having a fan filter unit (FFU), includes a flow sensor for sensing air flow inside a housing of a FFU. The sensor provides a sensor signal indicative of normal and adverse flow conditions in the housing. A control portion in data communication with the sensing portion outputs a control signal responsive to the sensing signal. An alarm in data communication with the control portion provides a warning when the control signal indicates the adverse flow condition.

In another aspect of the invention, a fan drive checking system, for an air conditioning system in a clean room having a plurality of fan filter units (FFU), includes a plurality of flow sensing portions. Each sensing portion senses air flow inside a housing of a respective one of a plurality of FFUs and provides a control signal indicative of normal and adverse flow conditions in the housing. A plurality of Local Control Units (LCUs) are each in data communication with a respective one of the plurality of flow sensing portions. Each LCU receives the control signal and provides a LCU drive-check signal responsive to the control signal. A network control portion in data communication with the plurality of LCUs, provides a network output signal indicative of the normal and adverse flow conditions of the plurality of FFUs. A host computer in data communication with the network control portions receives the network output signal and determines operational states of the plurality of FFUs.

BRIEF DESCRIPTION OF THE DRAWINGS

The invention is described with reference to the accompanying drawings in which.

DETAILED DESCRIPTION OF THE PREFERRED EMBODIMENTS

The present invention now will be described with reference to the accompanying drawings in which preferred embodiments of the invention are shown.

Figure 1:
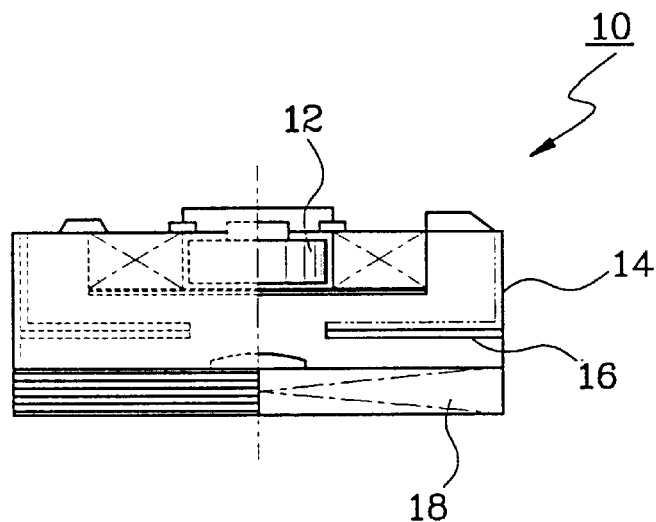
FIG. 1 is a schematic sectional view showing a conventional fan filter unit for installation in a semiconductor clean room air conditioning system.
Figure 2:
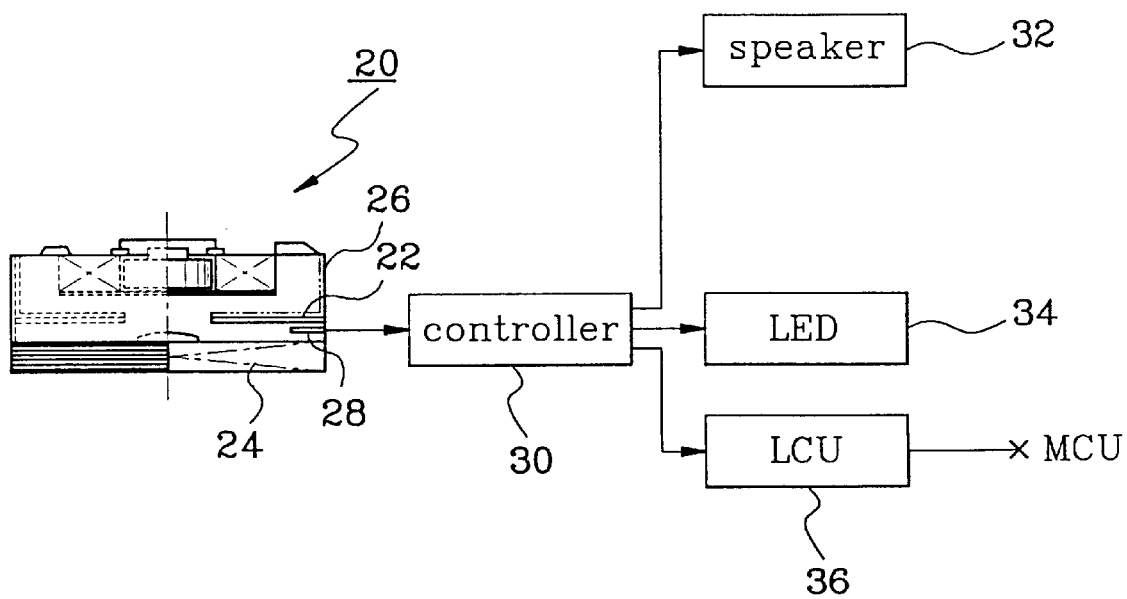
FIG. 2 is a block diagram showing one embodiment of the drive checking system of a fan filter unit for a semiconductor clean room air conditioning system according to the present invention.

Referring to FIG. 2, one embodiment of the present invention includes an insulator 22, a filter 24, and a sensor 28 inside a housing 26 of a fan filter unit 20. The sensor 28 between the insulator 22 and the filter 24 communicates electrically in one of two electronic states by means of a mechanical contact that depends on the direction of the air flow. One flow direction turns off the mechanical contact, another flow direction turns on the mechanical contact. The sensor 28 outputs a high or low level voltage sensing signal responsive to the above on or off mechanical contact. Though in this embodiment the actual flow is characterized by flow direction, the actual flow can be characterized by other aspects in other embodiments of a sensor.

In this embodiment, the sensor 28 of the fan filter unit 20 inputs the sensing signal to a controller 30 which is connected to a Light Emitting Diode 34 (LED), a Local Control Unit 36 (LCU), a speaker 32, or some combination of the three. The controller 30 receives the high or low sensing signal as input and outputs a control signal, for example, to the speaker 32 and the LED 34.

The LED 34 can comprise a single device or, if necessary, two devices that emit two different colors, lit alternatively according to the control signal received from the controller 30.

The LCU 36 transfers an LCU drive-check signal, responsive to the control signal, to an outside network represented in FIG. 2 by the network element MCU, which is described further below.

Figure 3:
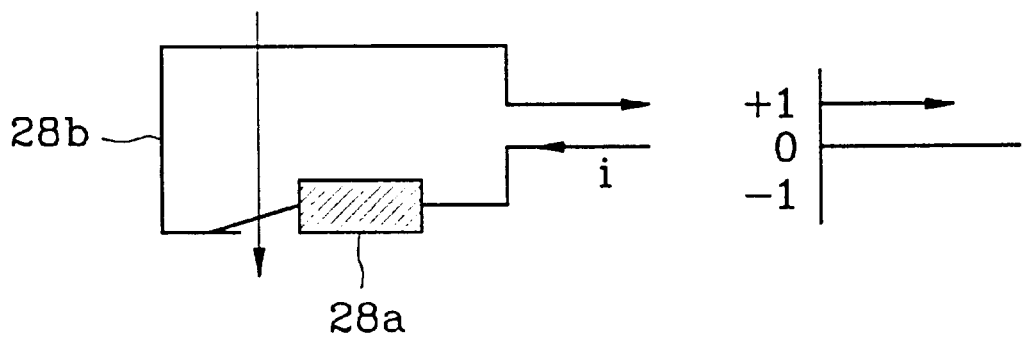
FIG. 3 shows the state of a sensor during the normal operation of a fan, and a signal corresponding thereto according to one embodiment of the present invention.

The sensor 28 senses the direction of the air flowing through the flow path formed inside the housing 26. In this case, as shown in FIG. 3, when the fan of the fan filter unit 20 is driven normally, the air is forced to pass the insulator 22, and flow through the filter 24 so as to be supplied to the inside of the clean room. When the air is supplied normally, the air flow has the correct direction, and the mechanical contact of the sensor 28, e.g., a contact between an input 28a made of aluminum material and an output 28b made of copper, is closed. When the contact is closed, i.e., the contact is on, the sensor 28 electrically supplies a high voltage level ("+1") to the controller 30 as the sensing signal.

Figure 4:
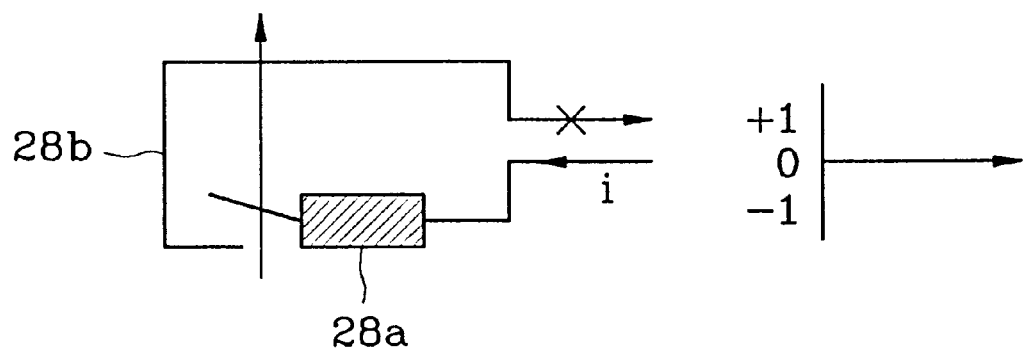
FIG. 4 shows the state of a sensor during a malfunction of a fan, and a signal corresponding thereto according to one embodiment of the present invention.

Alternatively, referring to FIG. 4, when the fan of the fan filter unit 20 is not driven, the pressure difference maintained between the outside and the inside of the clean room affects the fan filter unit 20. Then, an adverse air stream is formed, since the low pressure outside the clean room and high pressure inside the clean room causes the air to flow from the inside to the outside of the clean room, i.e. in the reverse direction. Under these conditions, the mechanical contact of the sensor 28, e.g., between the input 28a and an output 28b, is open. When the contact is open, i.e., off, the sensor 28 electrically turns off and supplies a low voltage level ("0") to the controller 30 as the sensing signal.

The controller 30 determines the state of the sensing signal (i.e., whether high or low) and outputs the control signal responsive thereto to the speaker 32 and the LED 34.

In the normal operational state, the control signal causes the speaker 32 not to produce a sound and the LED 34 to not emit light. When an adverse air stream is detected, the control signal causes the speaker 32 to produce a sound and the LED 34 to emit light. In another embodiment the LED emits one color when the normal air stream is detected, and a second color when the adverse air stream is detected.

The controller 30 may also input the control signal to the LCU 36 which transfers the information about the present operational state of the fan filter unit 20 via a Multi Control Unit (MCU) that connects units as part of a network. By using a network, the operation state of the fan filter unit (i.e., whether a normal or an adverse air stream is detected) is checked remotely.

In addition, the operational state of all the fan filter units installed in the ceiling of the clean room can be continuously monitored by connecting a flow sensing portion for each fan filter unit, e.g., a sensor 28 and a controller 30 as shown in FIG. 2, with an LCU 36.

Figure 5:
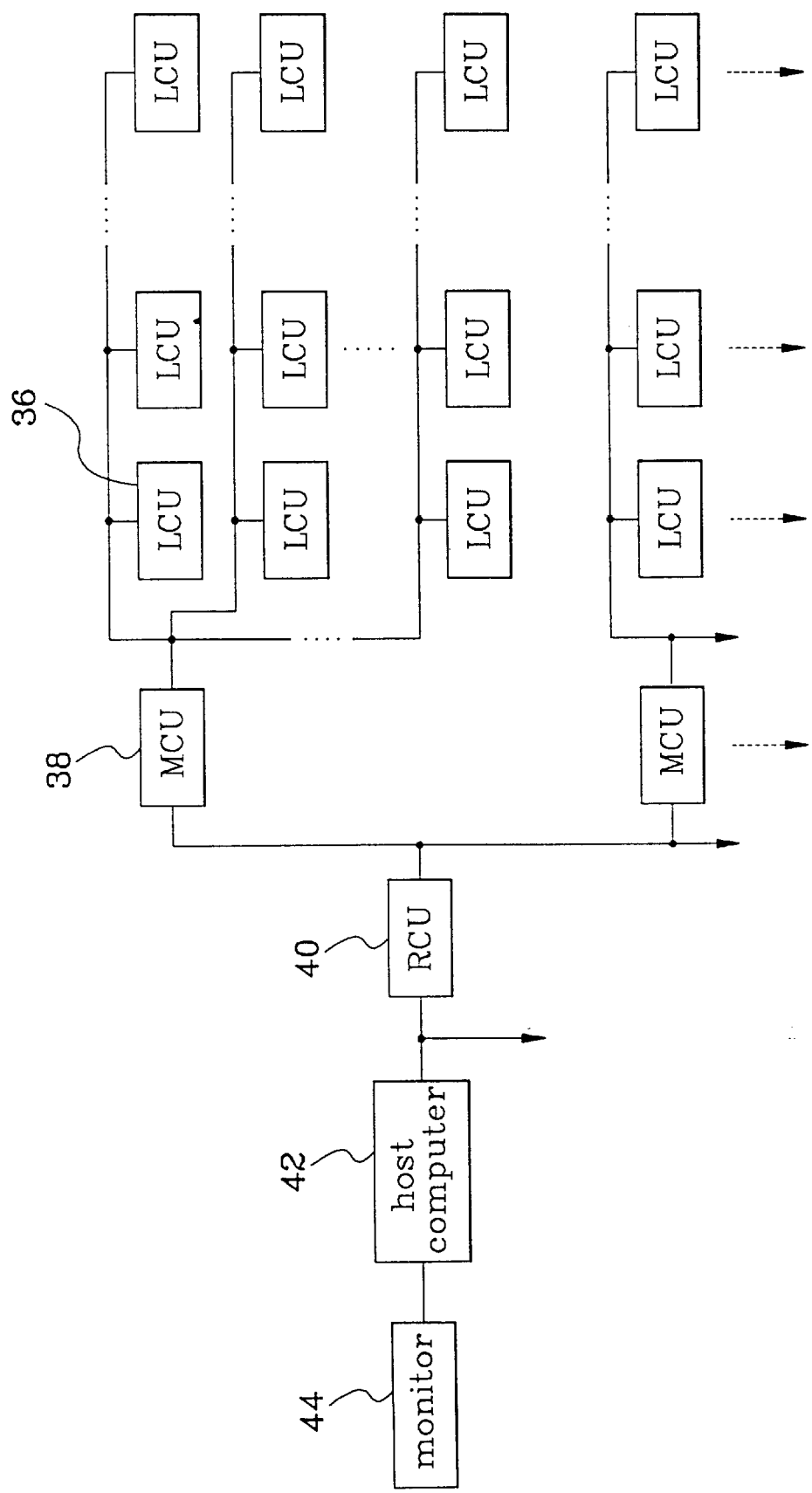
FIG. 5 is a block diagram showing a drive checking system for a network connected to a plurality of fan filter units for a semiconductor clean room air conditioning system according to one embodiment of the present invention.

The network system may be constructed as shown in FIG. 5. Each LCU 36, which is in data communication with its own fan filter unit 20, is connected to a network. All the LCUs 36 and all their communicating fan filter units are in data communication with a host computer 42 via the network. Thus, all fan filter units 20 installed in the clean room ceiling can be monitored and checked remotely at the host computer 42.

FIG. 5 illustrates that several of the LCUs 36 are grouped with one Multi Control Unit (MCU). In other words, a single MCU 38 is interfaced with a group of the LCUs 36. Then, a number of MCUs 38 are interfaced with a Relay Communication Unit (RCU) 40, and a number of RCUs are connected to the host computer 42. The MCU and RCU constitute a network control portion of the network, between the host computer and LCU.

The host computer 42 is connected to a monitor 44, and the information about the drive state of each fan inside its respective fan filter unit 20 is received via the network and displayed on the monitor 44.

Figure 6:
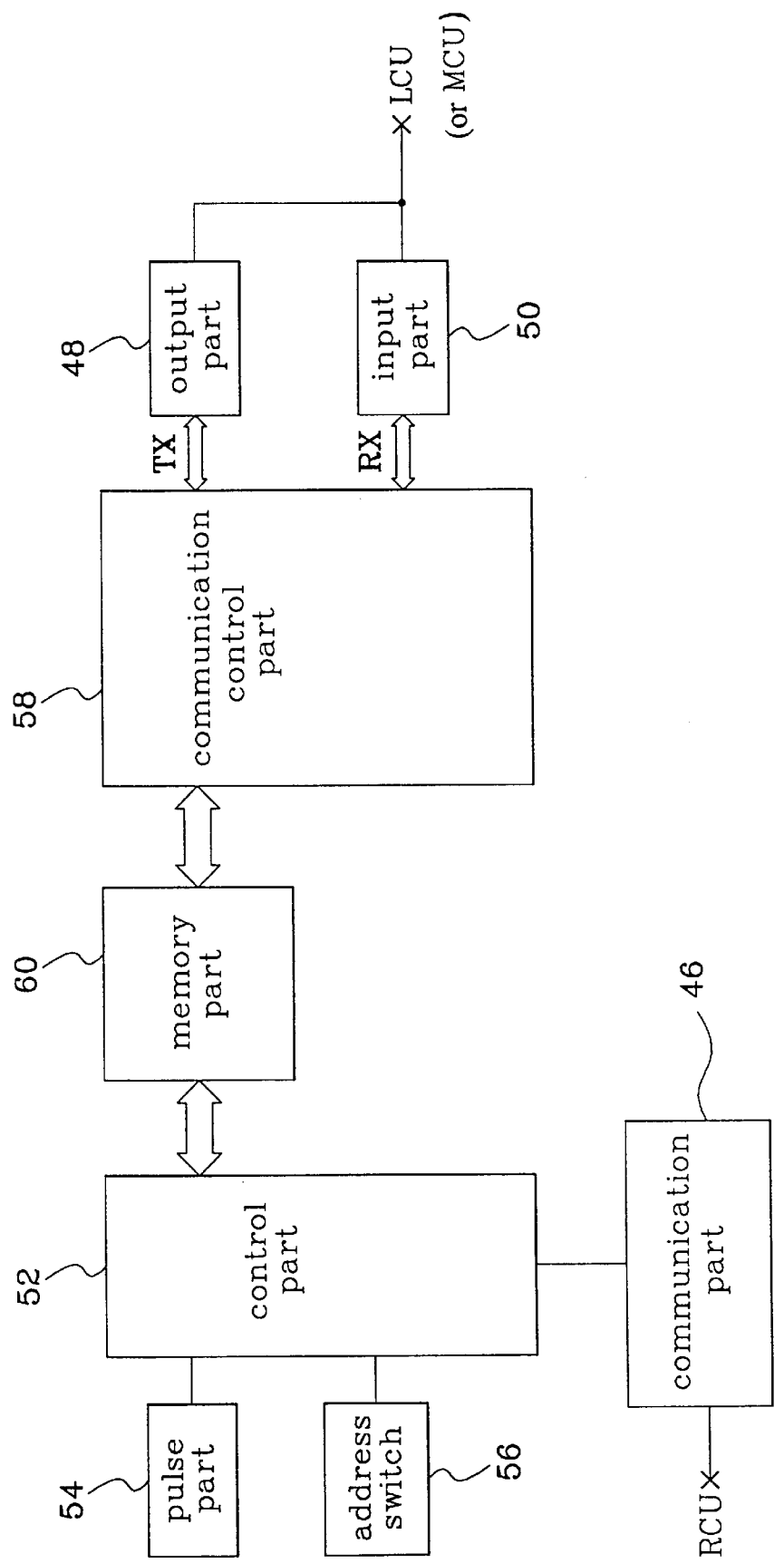
FIG. 6 is a schematic diagram showing details of either a Multi-Control Unit (MCU) block or a Relay Communication Unit (RCU) block of FIG. 5 according to one embodiment of the present invention.

FIG. 6 depicts the MCU 38 in one embodiment in detail. The MCU 38 includes a communication part 46 for data communication with the RCU 40 through a communication line. The MCU 38 includes a communication control part 58 in data communication with an output part 48 and an input part 50 for data communication with the LCU 36 in its group through a communication line.

A control part 52 is connected in data communication with the communication part 46, with a pulse part 54 for generating a pulse of a certain frequency, and with an address switch 56 for generating a specific address to define a specific individual MCU 38 among the number of MCUs. The control part 52 and a communication control part 58 communicate data to each other via a memory part 60. The communication control part 58 receives a receiving signal (RX) from the input part 50 and outputs a transfer signal (TX) through the output part 48. The input part 50 and output part 48 are in data communication with several LCUs 36, so that the MCU 38 communicates with several LCUs 36.

Figure 7:
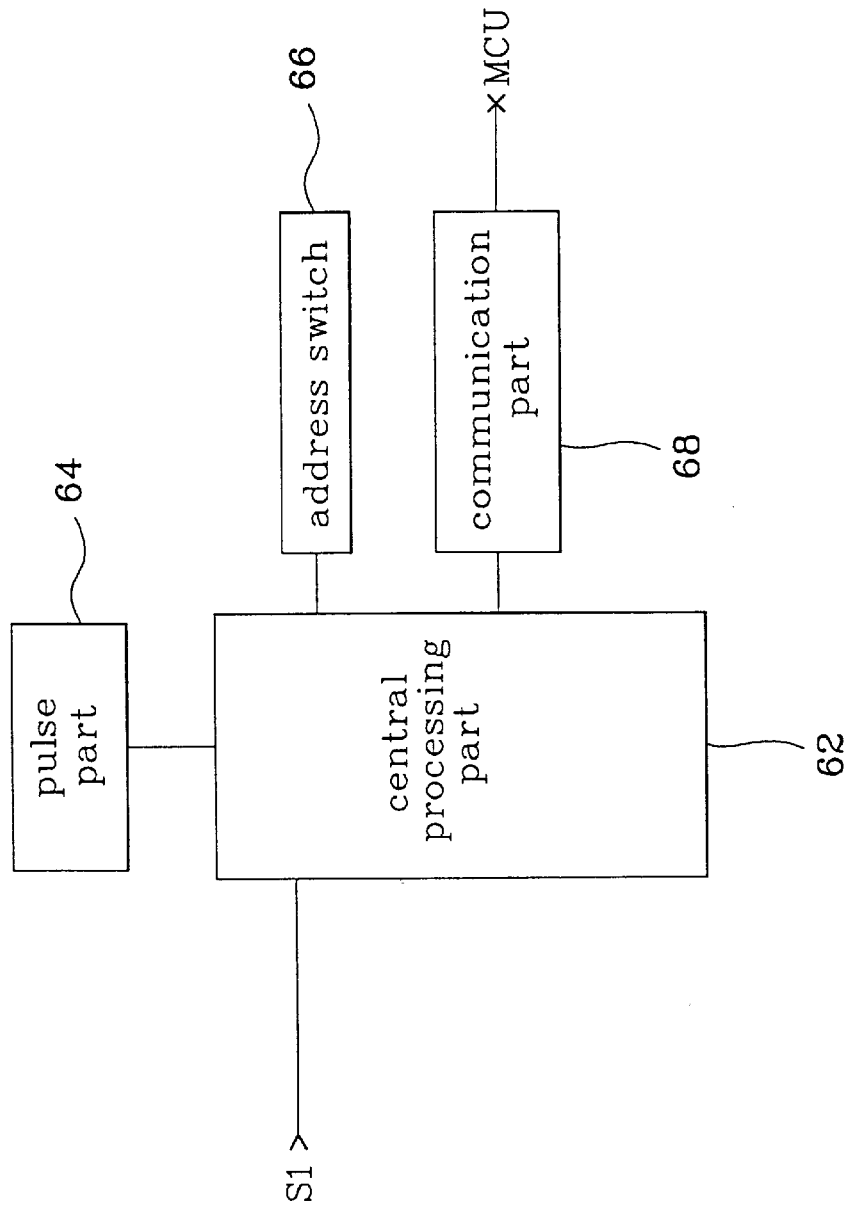
FIG. 7 is a detailed block diagram for a Local Control Unit (LCU) block of FIG. 2 and FIG. 5 according to one embodiment of the present invention.

FIG. 7 depicts the LCU 36, which has a central processing part 62, in data communication with the flow sensing portion, such as the controller 30, connected to the FFU 20 so that the LCU receives a control signal (S1) from the flow sensing portion. Connected to the central processing part 62 is a pulse part 64 for generating a pulse of a certain frequency, an address switch 66 to generate a specific address to distinguish a particular LCU from the other LCUs connected to the MCU group, and a communication part 68 for communication with the MCU 38.

Operation of this embodiment of the present invention is described next. First, referring to FIG. 7, the central processing part 62 of the LCU 36 is operated by the pulse of a certain frequency generated by the pulse part 64. When a control signal S1 from the controller 30 is provided to the central processing part 62, the central processing part 62 combines the control signal with a specific address which is generated in the address switch 66 and outputs the combined signal to the communication part 68. The communication part 68 transforms the combined signal from the central processing part 62 to an LCU drive-check signal recognizable to the MCU 38, and provides it to the MCU 38. In other words, the information about the drive state of each FFU 20 is transferred from the LCU 36 to the corresponding MCU 38.

Next, the MCU 38 receives the transferred signal and transfers it to the RCU 40. Referring to FIG. 6, the input part 50 of the MCU 38 transforms the signal from the LCU 36 into a signal RX which is recognizable to the communication control part 58, and transfers RX to the communication control part 58.

The communication control part 58 deciphers the signal from the input part 50 and then stores MCU data, indicative of the LCU drive-check signal, into the memory part 60. The communication control part 58 also checks the communication channel with the LCU 38 by outputting a channel check signal TX through an output part 48 to the LCU 38 in the MCU group, and checking the received LCU channel check signal, responsive to the channel check signal from the LCU 38. The information about the channel state, e.g., whether connected or broken, is written to the memory part 60 by the control part 58.

The information in the memory part 60 is read by a control part 52. The control part 52 is operated by the pulse of a certain frequency generated by the pulse part 54. The control part 52 combines the information read from memory and the specific address to distinguish a particular MCU from other MCUs generated by the address switch 56, and transfers this combined signal as an MCU drive-check signal to the communication part 46. The communication part 46 transfers the MCU drive-check signal from the control part 52 to the RCU 40.

Each RCU 40 receives information from the MCUs in its RCU group. Each MCU sends information about the LCUs in its MCU group. Then, the RCU 40 transfers all this information to a host computer 42 in an RCU drive-check signal.

The input, combine, output of the signals, and the channel check for the network connection in the RCU 40 are carried out in the same way as described above for the MCU 38 with reference to FIG. 6. The RCU 40 combines with its output signal a specific address to distinguish it among other RCUs. The information about the drive states of the FFUs corresponding to each RCU is thus transferred to the host computer 42.

The host computer 42 receives and stores the information transferred from each of the RCUs 40 in the corresponding RCU drive-check signals, and reads each address identifying the corresponding RCU 40, MCU 38, and LCU 36 so as to confirm which state is associated with which FFU. Then, the host computer 42 determines the information about the network communication channel states contained in the transferred information, and performs a self-examination function for the network.

As described above, the information for the drive state of all FFUs is checked and collected in the host computer 42, and the information about the drive states is converted into a display signal provided to the monitor 44. Thus, the drive states of all FFUs installed in the clean room are displayed on the monitor 44.

According to the present invention, an alarm (sound, light, or both) indicating the malfunctioning of each FFU is given at the site of malfunction, and the drive states of all FFUs in the clean room are checked remotely in the host computer connected, via a network, in data communication with all the FFUs. As a result, prompt action is possible in response to the malfunction of an FFU, and the contamination of the clean room due to failure of one or more FFUs is prevented.

In other words, according to the present invention, the drive states of a plurality of fan filter units installed inside a clean room for air circulation are checked individually so malfunctions are promptly detected, thereby preventing contamination inside the clean room and optimizing the production environment so as to improve the production yield.

It will be apparent to those skilled in the art that various modifications and variations of the present invention can be made without departing from the spirit or scope of the invention. Thus, it is intended that the present invention cover the modifications and variations of this invention provided they come within the scope of the appended claims and their equivalents.

What is claimed is:

1. A fan drive checking system for an air conditioning system in a clean room having a fan filter unit (FFU) including a housing located in the ceiling of the clean room, and a filter disposed in the housing, the fan drive checking system comprising:

a flow sensor, disposed above the filter and inside the housing of the FFU, for sensing air flow inside the housing and providing a sensor signal indicative of normal and adverse flow conditions in the housing, the normal flow condition being a flow of the air in a downward direction sequentially from a location above the filter, through the filter, and to a location below the filter and into the clean room;

a control portion in data communication with the sensor for outputting a control signal responsive to the sensor signal; and an alarm in data communication with the control portion for providing a warning when the control signal indicates the adverse flow condition.

2. The fan drive checking system of claim 1, wherein said flow sensor comprises an input, an output connected to said control portion, and a mechanical contact disposed in a path in which the air flows under the normal condition, said mechanical contact being connected to said input so as to be movable between a first position at which the mechanical contact contacts said output and a second position at which the mechanical contact is spaced from said output.

3. A fan drive checking system for an air conditioning system in a clean room having a fan filter unit (FFU) including a housing, and a filter disposed in the housing, the fan drive checking system comprising:

a flow sensor for sensing air flow inside the housing and providing a sensor signal indicative of normal and adverse flow conditions in the housing;

a control portion in data communication with the sensor for outputting a control signal responsive to the sensor signal; and an alarm in data communication with the control portion for providing a warning when the control signal indicates the adverse flow condition, said alarm including a first Light Emitting Diode (LED) for emitting a predetermined light as the warning, and a second LED for emitting a light of a color different than the predetermined light when the control signal indicates the normal flow condition.

4. A fan drive checking system for an air conditioning system in a clean room having a plurality of fan filter units (FFUs) each including a housing and a filter disposed in the housing, the fan drive checking system comprising:

a respective flow sensor for sensing air flow inside the housing of each FFU and providing a sensor signal indicative of normal and adverse flow conditions in the housing;

a respective control portion in data communication with each said sensor for outputting a control signal responsive to the sensor signal;

an alarm in data communication with the control portion for providing a warning when the control signal indicates the adverse flow condition; and a network having a plurality of local control units (LCUs) in data communication with the control portions, respectively, via communication lines, wherein each LCU of the plurality of LCUs receives the control signal from the control portion in data communication therewith and issues an LCU drive-check signal responsive to the control signal, each of said LCUs comprising a pulse part for generating a pulse of a certain frequency;

an address part for generating an identifying address that distinguishes each certain LCU from the plurality of LCUs in the network;

a communication part in direct data communication with the network; and a central processing part in data communication with the pulse part, the address part, the communication part, and the control portion, the central processing part receiving the pulse from the pulse part, combining information received in the control signal with the identifying address received from the address part, and producing the LCU drive-check signal.

5. A fan drive checking system for an air conditioning system in a clean room having a plurality of fan filter units (FFUs), the fan drive checking system comprising:

a plurality of flow sensing portions, each sensing portion being operative to sense air flow inside a housing of a respective one of a plurality of FFUs and providing a control signal indicative of normal and adverse flow conditions in the housing;

a plurality of Local Control Units (LCUs), each LCU being in data communication with a respective one of the plurality of flow sensing portions for receiving the control signal and providing a LCU drive-check signal responsive to the control signal;

a network control portion in data communication with the plurality of LCUs, providing a network output signal indicative of the normal and adverse flow conditions of the plurality of FFUs; and a host computer in data communication with the network control portion for receiving the network output signal and determining operational states of the plurality of FFUs.

6. The fan drive checking system of claim 5, the network control portion comprising:

a plurality of Multi Control Units (MCUs), each MCU being in data communication with a MCU-group of the plurality of LCUs, for receiving corresponding LCU drive-check signals and producing an MCU drive-check signal; and a Relay Control Unit (RCU) in data communication with a RCU-group of the plurality of MCUs, and in data communication with the host computer, for receiving corresponding MCU drive-check signals from the RCU-group, for producing a RCU drive-check signal;

wherein the network output signal includes the RCU drive-check signal.

7. The fan drive system of claim 6, wherein each MCU comprises:

a MCU input part for receiving the corresponding LCU drive-check signals;

a MCU communication control part in data communication with the MCU input part, for controlling the operation of the MCU input part, for receiving a signal responsive to the corresponding LCU drive-check signals, and for producing MCU data indicative of the corresponding LCU drive-check signals;

a MCU memory part in data communication with the MCU communication control part, for storing the MCU data;

a MCU pulse part for generating a pulse of a certain frequency;

a MCU address part for generating a MCU address that identifies the MCU from the plurality of MCUs in the medium part;

a MCU communication part in data communication with the RCU; and a MCU control part in data communication with the MCU memory part, the MCU pulse part, the MCU address part, and the MCU communication part, for operating in response to the MCU pulse part, and for combining MCU data retrieved from the MCU memory part with the MCU address received from the MCU address part to produce the MCU drive-check signal.

8. The fan drive checking system of claim 7, the MCU further comprising a MCU output part in data communication with the MCU communication control part and the MCU-group of the plurality of LCUs, wherein a channel check signal produced by the MCU communication control part is provided to the MCU-group through the MCU output part, and a LCU channel check signal is returned from the MCU-group, is received by the MCU input part, and is processed by the MCU communication control part to produce MCU channel data indicative of a MCU channel state.

9. The fan drive checking system of claim 8, wherein:

the MCU communication control part stores the MCU channel data in the MCU memory part, the MCU control part retrieves the MCU channel data from the MCU memory part, and the MCU drive-check signal is responsive to the MCU channel data.

10. The fan drive system of claim 6, wherein the RCU comprises:

a RCU input part for receiving the corresponding MCU drive-check signals;

a RCU communication control part in data communication with the RCU input part, for controlling the operation of the RCU input part, for receiving a signal responsive to the corresponding MCU drive-check signals, and for producing RCU data indicative of the corresponding MCU drive-check signals;

a RCU memory part in data communication with the RCU communication control part, for storing the RCU data;

a RCU pulse part for generating a pulse of a certain frequency;

a RCU address part for generating a RCU address that identifies the RCU from the RCUs in the network control portion;

a RCU communication part in data communication with the host computer; and a RCU control part in data communication with the RCU memory part, the RCU pulse part, the RCU address part, and the RCU communication part, for operating in response to the RCU pulse part, and for combining RCU data retrieved from the RCU memory part with the RCU address received from the RCU address part to produce the RCU drive-check signal.

11. The fan drive checking system of claim 10, the RCU further comprising a RCU output part in data communication with the RCU communication control part and the RCU-group of the plurality of MCUs, wherein a channel check signal produced by the RCU communication control part is provided to the RCU-group through the RCU output part, and a MCU channel check signal is returned from the RCU group, is received by the RCU input part, and is processed by the RCU communication control part to produce RCU channel data indicative of a RCU channel state.

12. The fan drive checking system of claim 11, wherein:

the RCU communication control part stores the RCU channel data in the RCU memory part, the RCU control part retrieves the RCU channel data from the RCU memory part, and the RCU drive-check signal is responsive to the MCU channel data.

13. The fan drive checking system of claim 5, wherein the normal and adverse flow conditions are normal and adverse flow directions, respectively.

* * * * *